United States Patent
Marshall et al

[11] 3,842,661
[45] Oct. 22, 1974

[54] SHOCK SPECTRUM ANALYSIS METHOD AND APPARATUS

[75] Inventors: Philip Marshall, Lexington; William C. Stevens, Jr., Chelmsford, both of Mass.

[73] Assignee: Marshall Research and Development Corporation, Burlington, Mass.

[22] Filed: Mar. 29, 1971

[21] Appl. No.: 128,698

Related U.S. Application Data

[62] Division of Ser. No. 715,399, March 22, 1968, Pat. No. 3,659,456.

[52] U.S. Cl. ................................. 73/67.1
[51] Int. Cl. ................................. G01h 1/00
[58] Field of Search ............ 73/67, 67.2, 71.4, 67.1, 73/71.5, 71.6, 71.2; 328/127

[56] References Cited
UNITED STATES PATENTS

| | | | |
|---|---|---|---|
| 3,015,949 | 1/1962 | Arnold | 73/71.5 |
| 3,157,045 | 11/1964 | Maki | 73/71.6 |
| 3,345,864 | 10/1967 | Painter et al. | 73/71.6 |
| 3,420,098 | 1/1969 | Painter et al. | 73/71.6 |
| 3,434,060 | 3/1969 | Painter et al. | 128/127 |
| 3,555,890 | 1/1971 | Goldwater | 73/71.4 |

*Primary Examiner*—James J. Gill
*Attorney, Agent, or Firm*—Schiller & Pandiscio

[57] ABSTRACT

A shock spectrum analysis and synthesis method and apparatus which includes the use of a shock spectrum analyzer and a shock spectrum synthesizer. The analyzer is a special purpose analog computer which provides an automatic shock spectrum analysis of both the primary and residual spectrum by solving the equation of motion for a single degree of freedom, mass-spring-damping system and displaying the output signals on an oscilloscope or X-Y recorder. The synthesizer generates a variable transient electrical input to a vibration shaker system by generating a plurality of steady state signals each having a different frequency and gating and summing the signals.

9 Claims, 7 Drawing Figures

INVENTORS
PHILIP MARSHALL
WILLIAM C. STEVENS JR.

INVENTORS
PHILIP MARSHALL
WILLIAM C. STEVENS JR.

SHOCK SPECTRUM ANALYSIS METHOD AND APPARATUS

This application is a division of our application Ser. No. 715,399 filed Mar. 22, 1968 entitled Shock Spectrum Analysis and Synthesis Method and Apparatus which issued May 2, 1972 is U.S. Pat. No. 3,659,456.

BACKGROUND OF THE INVENTION

In any vibration time history, those phenomena that do not last long enough to be considered part of a stationary process, and that are not repeated often enough to be studied statistically, will be called transients. A rapidly applied transient motion will be referred to as a shock if its duration is shorter than the shortest decay time associated with the significant interior resonances of the structure to which it was applied.

Two basic methods are used to describe a shock motion: in terms of its intrinsic characteristics, and in terms of the effects it causes on the structures to which it is applied. The first method can be used in the time or in the frequency domain, and for a complete definition the acceleration, velocity, or displacement records of the input transient are necessary. The second method is said to be in the response domain because it is concerned with the response of the structure, equipment, or system, rather than with the nature of their excitation. With this method, the description is related to the damage potential of the shock.

Unfortunately, not much is known about the fundamentals of damage caused by shocks. It is usually assumed that damage is caused by the acceleration experienced within the equipments or structures. Shock spectrum testing is based on the concept that the severity of a shock should be measured by or related to the response of a single degree of freedom mass-spring system, and not on any characteristic of the shock itself. This concept has not been adopted universally yet, but it offers definite advantages over the methods which are concerned only with the nature of the input shock transient.

If the shock is defined in terms of its intrinsic characteristics, the shock measurement is normally a time plot of a shock parameter over the duration of the shock. Most shock pulses are measured with accelerometers although velocity pickups are sometimes preferred because of their higher sensitivity. The higher frequency components of the shock are generally attenuated by filters.

If the shock is defined in the response domain, measurement of the response spectrum can be made directly by using a read gage, and recording the maximum deflection of the reeds relative to the frame. Now it is also possible to measure the spectrum using a shock synthesis and analysis system. No filtering of the accelerometer signal that would affect the shock spectrum in the frequency band of interest is required.

In general, shock tests are performed for two purposes: to determine if the equipments or structures will withstand actual field conditions, as in acceptance testing, and to evaluate the nature of failures as an aid in the design of those equipments or structures.

Prior art shock testing of structures has usually been accomplished by drop testing or by impacting the equipment with a moving mass. More recently attempts have been made to use electrodynamic shake tables for applying the desired test transient. These efforts have accompanied the production of large shake tables and electronic amplifiers, and have arisen not only from the desire to allow greater flexibility in controlling the magnitude and duration of the test pulse, but also from a consideration of potential cost reduction that can be realized if the same apparatus could be used for both shock and vibration testing. For the most part, the use of electrodynamic shake tables has been confined to the production of approximate classical time functions, such as the half-sine and saw-tooth acceleration pulses. These test pulses generally bear little resemblance to the complex transients actually experienced in the operating environment encountered in missiles and space vehicles during ignition, stage separation and landing impact. The amplitude and duration of the test pulses are generally so chosen as to produce a shock spectrum, that is, at all frequencies, in excess of that associated with transients measured in the actual operating environment. Since the pulse shape fixes the shape of the response spectrum, the test engineer must accept spectral magnitudes at some frequencies that are considerably in excess of operational levels. Furthermore, it is usually not possible to ameliorate the distortion introduced by the dynamic response of the test fixture.

The three approaches to shock testing which may be utilized in describing a shock test are: (1) specify the shock machine on which the test is to be performed; (2) specify the shock pulse shape or (3) specify the shock spectrum.

In the approach where the shock machine is specified, test specimens are bolted to the machine bed which is belted by a large hammer. Since the machine bed has many structural resonances, the passing or failing of a test could be determined by the location on the table bed where the specimen was fastened. It is not unknown for a specimen to pass a test on one machine and fail an identical test when tested on another machine. If the test specimen failed, the design engineer has little information to utilize to redesign the failed item. Equipment which passes these tests usually have a good record of serviceability. These machines were developed to simulate the effects of gun blast on shipboard equipment. The sand-drop shock machine is another example where the test is specified by designating the machine. Here, the test specimen on the shock machine table is dropped on a bed of sand from a predetermined height. The resulting pulse shape does not repent accurately.

Many industrial and military specifications define the time history of the acceleration shock pulse. Typical shapes are the half-sine and saw-tooth. Here, at least the shock pulse is defined mathematically. However, to specify a pulse shape one must also specify the associated tolerances which can become difficult because of fixture resonances and characteristics of the instrumentation used to measure the pulse such as a high and low frequency response. The results of these tests usually are very repeatable when performed on the same shock machine. However, the same results are not always obtained on different machines because of differences in actual pulse shape and fixture or machine resonances.

Shock spectrum is defined as the maximum response of a series of single-degree-of-freedom systems to a transient pulse as a function of the natural frequency of the system. The procedure in the shock spectrum approach is to specify the damaging effects of the shock in terms of response motion instead of defining the shock itself or the method of generating the shock as in the previous paragraphs.

This method for describing a shock transient involves the determination of the response spectrum produced by the transient. The response spectrum does not define the shock transient but instead defines the effect of the shock upon the dynamic response of hypothetical single-degree-of-freedom resonators having various natural frequencies. There are several types of response spectra which are employed. First of all, the hypothetical resonators may be damped or undamped, thereby yielding damped or undamped response spectra. Secondly, the total response spectrum, whether damped or undamped, can be divided into a primary spectrum and a residual spectrum. The primary spectrum is defined as the peak value of the response that occurs during the time interval that the shock transient is in effect; the residual spectrum is the peak response after the shock transient has terminated. The peak response that occurs, irrespective of when it occurs, defines the total spectrum. In practice, the total spectrum is generally employed, and in general, some level of damping is assigned to the hypothetical resonators.

Typical examples of where shock spectrum information would be utilized are: (a) To define shipping environments such as car humping; (b) To define nuclear weapons environments as in hardsite specification where the actual waveform of the shock is extremely complex; (c) To define the pyrotechnic effects of missile stage separation: (d) To comply with military program shock pulse specifications: (e) To determine the actual severity of shock pulses generated in many laboratories to the same specification; (f) To determine the damage potential of a complex transient environment; (g) To determine the maximum values of acceleration, velocity, and relative displacement involved in the shock motion; (h) To provide the design engineer with meaningful data he can use to perform a stress analysis; (i) To satisfy shock test specifications; (j) To provide data on why a specimen has failed to pass a shock test.

Shock spectrum has been defined as the maximum response of a series of single-degree-of-freedom systems to a transient pulse as a function of the natural frequency of the system. This information can be used to define the damage potential of a transient pulse because it defines the maximum responses which may be related to induced stress.

The excitation motion, common to all systems, is a transient acceleration of the base $\ddot{y}$. Each mass spring combination has a different natural frequency. It should be noted that the response acceleration motion of the mass, $\ddot{x}$, is a function only of the natural frequency of the system. That is, masses of 1 pound or 1 ton would respond with identical motion if both were supported on spring suspensions which give the identical natural frequency. $\ddot{x} + 2\theta\omega_n (\dot{x} - \dot{y}) + \omega^2_n (x - y) - 0$ where:
$\ddot{x}$ is the absolute acceleration of the mass
$\dot{x}$ is the absolute velocity of the mass
$x$ is the absolute displacement of the mass
$\dot{y}$ is the absolute velocity of the base
$y$ is the absolute displacement of the base
$\omega_n$ is the natural frequency of the system $\theta$ is the percent of critical damping A typical time history acceleration response of system $\omega_n$ may for example respond to a half-sine shock pulse of period t. The response is considered in two parts, i.e., the maximum response which occurs during the time duration, $t$, of the input and the maximum response which occurs after the duration of the input. The former is called the primary and the latter is called residual spectrum. Residual responses are free vibrations since the excitation is over when they occur. Shock spectrum may now be defined as the primary and residual points plotted as a function of the natural frequency of the system over a broad frequency range.

In the low frequency range the shock spectrum curves are proportional to a constant velocity line. The velocity (relative velocity between the mass and its support) is the area under the input acceleration curve $\ddot{y}$. In this frequency region the shock pulse may be considered to be an impulse or an instantaneous velocity change and the area of the acceleration time history is the governing parameter because of the inertia of the mass spring system.

A response spectrum is a measure of the shock transient only in a very restricted sense. There does exist a one-to-one correspondence between the absolute value of the Fourier spectrum of the transient in the undamped residual spectrum, but no such relation exists for total spectrum. Even for the case of a defined undamped residual spectrum, it is not possible to define the shock transient (or its complex Fourier spectrum) since no phase information is available.

Heretofore, little attention has been given to the problem of determining the transient time functions that will yield given response spectra versus frequency patterns. Nevertheless, there has existed a real need to devise laboratory environmental shock tests whose response spectra would follow some desired variation over the frequency range of interest. As mentioned hereinabove, prior to this invention this need has been side-stepped by employing shock test machines to produce a time function that approximates a classical pulse shape (such as a half-sine, triangular, or square pulse). The response spectra associated with these "classical" pulses are well known and by making the pulse amplitude great enough, a sufficiently severe test can be achieved.

There are a number of disadvantages associated with using classical pulse tests and among them is the limited control over shaping the spectrum contour. As a result, excessive response levels must usually exist at certain frequencies in order to assure sufficiently high levels at other frequencies.

Electromagnetic vibration shake tables have been sufficiently refined, that some interest has been directed to their use for shock testing. For convenience and brevity throughout the following description, the term "shaker" will be used to indicate an electrodynamic shake table. Originally, primary interest centered on using shakers to obtain classical pulses, but more recently the emphasis has been on producing rather complicated oscillatory shock transients that are similar to those measured in flight vehicles. To this end, it is highly desirable to devise a method for defining oscillatory transients that will produce a desired spectral pattern. In particular, assuming that a shaker can produce an mechanical input transient to the test specimen with limited distortion, it is desirable to not only define a suitable shock transient but also to produce it in the form of electrical input signals to the shaker.

One prior art shock spectrum analysis and synthesis system employs an analyzer which does not have an automatic plotting capability and a synthesizer which employs a plurality of passive filters which must be individually adjusted for gain. The shock spectrum analysis and synthesis of the present invention includes a number of features and advantages which are not included in prior art systems. One feature of the present invention is the employment of a frequency generation technique which generates a frequency by using discrete free-running oscillators, with each being adjustable in frequency over a narroe range. In the preferred embodiment of the present invention, the synthesizer employs 30 oscillators which are spaced in frequency in ⅓ octave increments. The range of operation of the synthesizer, 12.5 Hz to 10 KHz, is a wider frequency range than prior art systems. Also, the present synthesis system is capable of producing more accurate results due to the ability to align frequency with the natural frequencies of the analyzer. In the prior art systems using the passive filters, there is no control over the time at which the discrete frequencies are applied to the amplifier of the shaker. In the present invention, the timing of the application of the frequency to the shaker amplifier is completely controllable because of the gating technique employed. The advantage derived from the gating technique is that by selective gating, the maximum component value at any frequency can be made simultaneously available with all other frequencies to the shaker amplifier.

Another feature of the present synthesis system is that the duration of the application to the shaker amplifier at any frequency is variable so that the minimal required number of cycles at the system's input are generated in order to allow the analyzer to build up to its maximum response. Also, the leveling feature of the present invention provides resetability and locking which is not available in prior art systems. The present system also employs a built-in master gain control and shaker drive amplifier. A multiplier switch is also provided to prevent over-testing at full level. Finally, the timing circuitry of the present system allows the frequency to be gated, such that all signals are terminated simultaneously. Thereby, contributions to the maximum response from all lower frequencies are included.

The analyzer employed in the present invention has a number of features and advantages not present in prior art analyzers. A principal feature is that the analyzer of the present invention is fully automatic, i.e., tape recorded data off a shock transient may be analyzed automatically over the frequency range by the use of automatic frequency incrementing circuits. Also, the analyzer and peak reading circuit are integrated into a single unit. Another feature is the provided mode circuitry which allows direct but separate primary shock analysis and residual shock analysis. The provision of a test pulse generator permits internal calibration for the entire system. By utilizing 1/6 octave frequency increments the analyzer of the present invention may achieve a more detailed shock spectrum analysis because of the greater number of samples provided. Also, the Q (damping) range is wider than in prior art systems. The present analyzer also provides a mode known as minimum damping which simulates infinite Q for the purpose of Fourier-type residual analysis. Finally, the analyzer includes a preset feature for determining the maximum frequency to be analyzed so that, although the tape may continue to run, the analyzer will stop its analysis when the desired maximum frequency has been reached.

SUMMARY OF THE INVENTION

The above advantages and features of the present invention are achieved by providng a method of producing an electrical transient having a response spectrum corresponding to a desired pattern over a given frequency range, comprising the steps of: simultaneously generating a plurality of steady state electrical oscillating waves each having a different frequency; gating each of the oscillating waves in an order corresponding to the lower frequencies first so that all frequency components may build up responses and all frequencies end simultaneously; and summing all of the waves thereby producing the desired electrical transient.

The advantages of the shock spectrum synthesis system of the present invention are achieved by providing an apparatus for producing an electrical transient waveform having a given response spectrum comprising: means for simultaneously generating a plurality of steady state electrical oscillating waves, each of said waves having a different frequency; means for gating each of the oscillating waves in an order corresponding to the lower frequencies first so that all frequency components may build up responses and all frequencies end simultaneously; and means for summing all of the waves thereby producing the desired electrical transient.

The shock spectrum analysis capabilities of the present invention are accomplished by providing a method of analyzing an electrical transient having a response spectrum over a given frequency range, comprising the steps of: applying a signal representing input acceleration to a test specimen; computing the response of a single-degree-of-freedom mass spring damping system of a specified natural frequency to that acceleration; automatically incrementing the response of such a single-degree-of-freedom mass spring damping system to another natural frequency for analysis; applying the computed responses to a peak sampling and holding circuit; and displaying this peak value of the responses of an internal meter.

More particularly, the shock spectrum analysis system of the present invention is made up of an apparatus for analyzing an electrical transient having a response spectrum over a given frequency range, comprising: means for applying a signal representing input acceleration to a test specimen; means for computing the response of a single-degree-of-freedom mass spring damping system of a specified natural frequency to that acceleration; means for automatically incrementing the response of such a single-degree-of-freedom mass spring damping system to another natural frequency for analysis; means for establishing the peak value of the computed responses; and means for displaying the peak value of the responses.

DESCRIPTION OF THE PREFERRED EMBODIMENT

Figure 1:
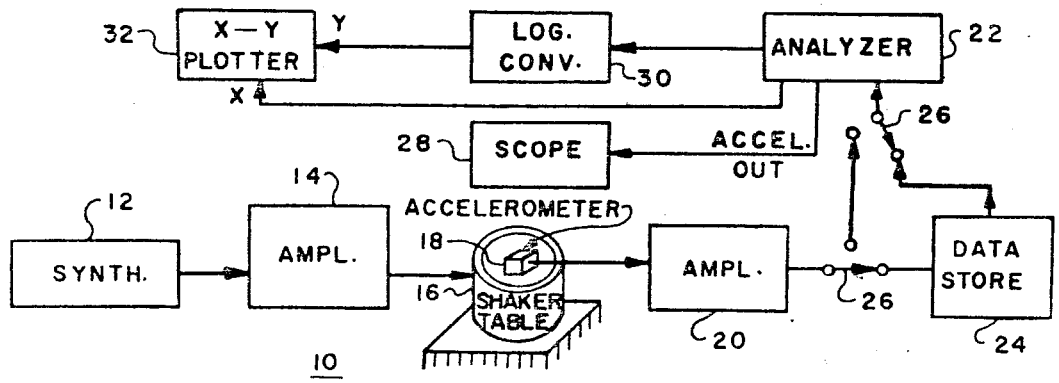
FIG. 1 shows the shock spectrum analysis and synthesis system for carrying out the method of the present invention.

FIG. 1 shows a lock diagram of the shock spectrum analysis and synthesis system of the present invention. The shock spectrum analysis and synthesis system 10 includes a shock spectrum synthesizer 12. The output of the synthesizer 12 is connected to a shaker amplifier 14 whose output, which is a complex transient waveform is applied to a shake table 16 which may be a conventional electrodynamic shaker. On the shake table 16, or at a point on the test specimen considered to be the point of application of the shock input, is mounted on accelerometer 18 which senses the motion transient. The output from the accelerometer 18 is applied to a signal conditioning amplifier 20. The output from the amplifier 20 either is applied directly to a shock spectrum analyzer 22 or indirectly to the analyzer 22 via a data storage unit 24 as shown by the appropriate switches 26. The data storage system 24 may be a recording tape loop on which the desired test sequence is recorded. The amplifier 20 matches the output of the accelerometer 18 to the input of either the analyzer 22 or the data storage unit 24 depending on whether or not the data storage system is employed. Connected to one output referred as the peak output of the analyzer 22 is a logarithmic converter 30. The output of the converter 30 is applied to the Y axis of an X-Y plotter 32. A direct output from the analyzer 22 is applied to the X-axis of the plotter 32. An acceleration output of the analyzer 22 is connected to a monitoring oscilloscope 28.

The synthesizer 12 of the system 10 generates a variable transient electrical input to the vibration shake table 16. The accelerometer 18, which in the embodiment of FIG. 1 is mounted on the shake table 16, detects the mechanical acceleration generated by the table and the accelerometer signal after proper conditioning is applied to the input of the analyzer 22. Therefore, the transfer function of the shake table 16 and the mechanical feedback for the test specimens are included in the system. Repetitive low level inputs are applied and analyzed in 1/6 octave steps until a complete spectrum is plotted. The system is equalized until the plotted spectrum shape matches the desired spectrum shape. Then full input is applied once, and is recorded on magnetic tape. The analyzer 22 is then removed from the system and is used to analyze the taped data. The test specimen is required to sustain only one shock input at full level. The desired spectrum might be generated according to $g$, the acceleration due to gravity defined as one $g - 980$ cm/sec.$^2$, peak vs. $\omega_n$ data or to match analyzer data computed from an actual complex shock which might result, for example, from a pyrotechnic event.

SYNTHESIZER

Figure 2:
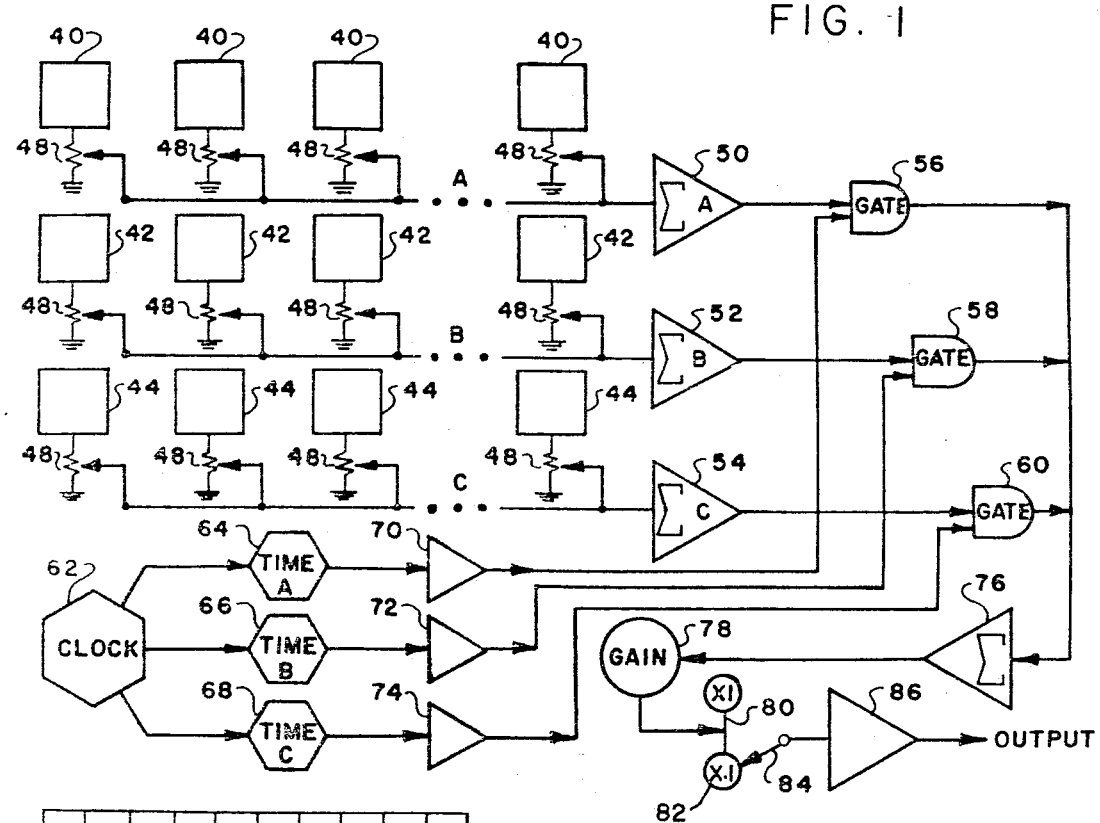
FIG. 2 illustrates a block diagram of the shock spectrum snythesizer shown in FIG. 1.

The operation of the synthesizer 12 is based upon the transient response of a single-degree of freedom system to a sinusoidal input. For example, if the system has a natural frequency of 100 Hz, with a Q of 10, a 1 $g$ input oscillation will evoke a 10 $g$ response at resonance, provided the transient oscillation lasted long enough to reach steady state. At frequencies above the natural frequency by one decade, the response would be reduced by 60 db. The embodiment of the synthesizer 12 shown in FIG. 2 employs 30 variable oscillators divided into three decades A, B and C. Decade A includes ten oscillators 40 starting with the first oscillator at 12.6 Hz and increasing in ⅓ octave steps to 100 Hz. Decade B includes ten oscillators 42 beginning at 126 Hz up to 1 KHz. Finally, decade C includes ten oscillators 44 with the first beginning at 1,260 Hz up to 10 KHz. Each of the oscillators has separate gain control provided by potentiometers 48 connected to the output of each oscillator. The gain control provided by each of the potentiometers 48 and a 0.1 percent resetability. The output of the potentiometer 48 in each of the decades A, B and C respectively are connected in parallel within each decade.

The output from each of the oscillators 40 in decade A are summed in a summing circuit 50. Each of the outputs from the oscillator 42 in decade B are summed in a summing circuit 52 and the outputs of each of the oscillators in 44 are summed in a summing circuit 54. The outputs from each of the summing circuits 50, 52 and 54 are applied to gating circuit 56, 58 and 60 respectively. Each of the gating circuits 56, 58 and 60 are supplied with timing signals provided from a master clock 62. The master clock 62 applies signals in parallel to timing circuits 64, 66 and 68 which correspond to gating circuits 56, 58 and 60 respectively. The output from timing circuit 64 is applied to driver 70 whose output is applied to the gating circuit 56. The output from the timing circuit 66 is applied to driver 72 whose output is fed to the gating circuit 58 and the output from the timing circuit 68 is applied to a driver 74 which supplies the gating circuit 60.

The output from the gating circuits 56, 58 and 60 are applied to a summing circuit 76 whose output is applied to a master gain circuit 78. The output from the master gain circuit 78 is applied to a times one or times 1/10 miltiplier 80 or 82 respectively. The desired multiplier 80 or 82 is selected by a switch 84 and the desired selection is applied to a shaker drive amplifier 86. The output from the shaker drive amplifier 86 is applied to the shaker power amplifier 14 shown in FIG. 1. Therefore, the synthesizer 12 provides a plurality of leveled sinusoids which are gated and summed in such a manner so as to produce a single complex input transient to the shaker power amplifier 14. The output transient of the synthesizer 12 can be programmed for single shocks or may run freely at an adjustable rate. The basic period of the transient may be, for example, one second, with the period of each decade adjustable with respect to the basic period. In order to avoid over testing and fatigue at the higher frequencies, the on periods of higher frequency decades are proportionally shorter. In order to allow all frequency components to build up responses, the higher frequencies are gated on last and all frequencies are terminated simultaneously. All frequencies within each of the decades A, B and C are summed in summing circuits 50, 52 and 54 respectively, gated by gating circuits 56, 58 and 60 respectively and then summed by summing circuit 76 and applied to the master gain circuit 78 which determines the final signal level to the shaker power amplifier 14. The two position multiplier switch 80 allows the output level to be reduced to 1/10 of full output for equalization purposes.

Equalization in synthesizer 12 is accomplished by test procedures, not by trial and error, as in some prior art systems. All level controls are zeroed and then proportional settings are made for each frequency output starting with the lowest to the highest. In order to correct for any interaction between adjacent frequencies, a second pass may be made from the lowest to the highest frequencies. The second pass should produce less then a 10 percent variation from the desired spectrum and, if necessary, a third pass from lowest to highest will further reduce this variation. The levels are set using the potentiometers 48 which are ten turn 1/10 percent linearity precision locking potentiometers with an integral readout providing 1/10 percent resetability.

ANALYZER

Analyzer 22 (which will be described in further detail later) is a special purpose analog computer designed to solve the differential equation:

$$\ddot{x} + 2\theta\omega_n(\dot{x} - \dot{y}) + \omega_n^2(x - y) = 0 \quad (1)$$

where:
 $\ddot{x}$ is the absolute acceleration of the mass
 $\dot{x}$ is the absolute velocity of the mass
 $x$ is the absolute displacement of the mass
 $\dot{y}$ is the absolute velocity of the base
 $y$ is the absolute displacement of the base
 $\omega_n$ is the natural frequency of the system
 $\theta$ is the percent of critical damping The forcing function for the above differential equation is the acceleration of the base, $\ddot{y}$. The maximum responses of $\ddot{x}$ during and after the shock pulse respectively, when plotted as a function of natural frequency, are the primary and residual spectra of the transient input. The analyzer 22 employs a series of networks and solid-state operational amplifier modules.

Figure 3:
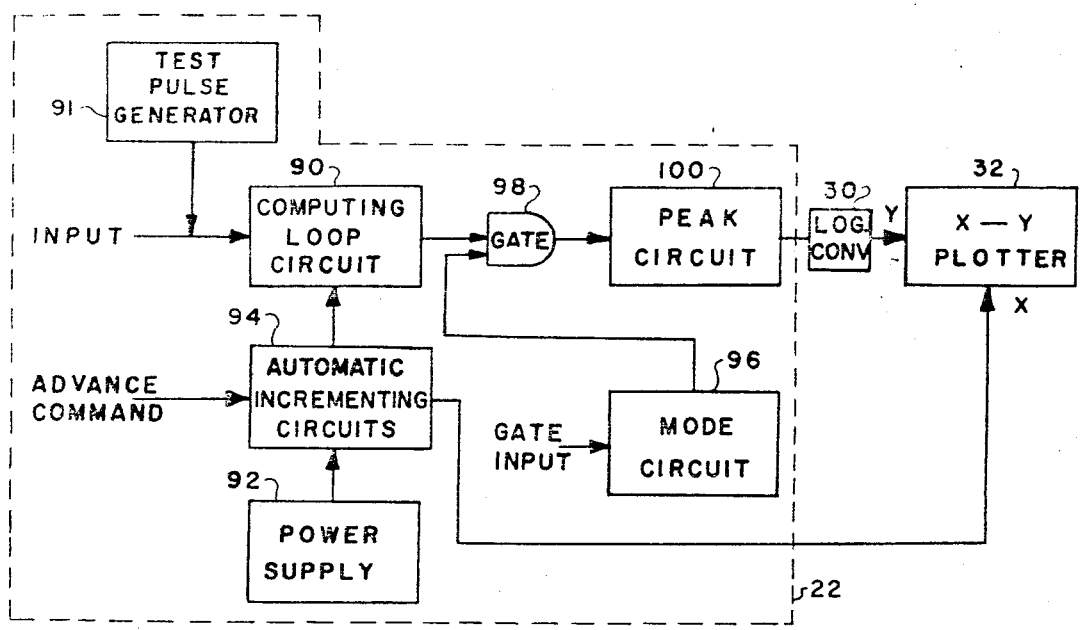
FIG. 3 is a block diagram of the shock spectrum analyzer shown in FIG. 1.

FIG. 3 shows a block diagram of the shock spectrum analyzer 22 shown in FIG. 1. The input to the analyzer is applied to computing loop circuit 90. Also applied to the input of computing loop circuit 90 is a test pulse from a test pulse generator 91 which is used for calibrating the analyzer 22. A power supply 92 provides the necessary power to operate the analyzer 22. Automatic incrementing circuits 94 provide the control and reset functions for the analyzer.

The output from the automatic incrementing circuits 94 is applied as an electromechanical input to the computing loop circuit 90. A mode circuit 96 is provided for selecting the particular mode of operation of the analyzer. The mode circuit 96 has a gate input applied thereto and the output of the mode circuit 96 is applied to a gate 98. Also applied to the gate 98 is the output from the computing loop circuit 90. After the output from the computing loop circuit 90 is gated through gate 98, the signal is applied to a peak circuit 100. The output from the automatic incrementing circuits 94 which contains the X-axis signal, and the output from the peak circuit 100, which contains the Y-axis signal are applied to X-Y plotter 32. The Y-axis signal is applied to the X-Y plotter 32 via the log converter 30.

The analyzer 22 has three modes of operation — primary, residual and both. The natural frequency, $\omega_n$, may be selected in three ways. Vernier selection is accomplished by a calibrated dial which permits continuous selection of frequencies with infinite resolution over any decade of the frequency range of the analyzer. A manual selection of $\omega_n$ is accomplished by a push button selection in fixed 1/6 octave steps over the frequency range. Finally, $\omega_n$ may be automatically selected in 1/6 octave steps and decade steps in response to an external advance command from the data storage unit 24.

The damping factor Q is selected in fixed steps of 10, 20, 30, 40, 50 and 100 or by a continuously variable infinite resolution dial calibrated from 3 – 100. A mode known as minimum damping or infinite Q is also provided for a Fourier-type residual analysis of pulse inputs.

The analyzer 22 may directly and separately analyze both primary and residual spectra. This separate analysis of the primary and residual spectra may be accomplished by an external gating signal which may be used to inhibit the peak circuit 100 during or after the input transient. The input to the analyzer 22 is an excitation forcing function which is the acceleration of the base $\ddot{y}$. This signal may be obtained from the accelerometer 18 of the shake table 16 or from the data processing unit 24 in the form of a tape recorder. The analyzer 22 does not require specific input leveling since it is linear over a wide dynamic range and inputs may be leveled to the best utilization of that dynamic range. Signals from the output of the analyzer 22 representing the time history of the acceleration of the sprung mass are visually displayed on the scope 28. In addition, the analyzer may be utilized with x-y plotter 32 and a voltage proportional to log frequency is made available to drive the X-axis on the plotter. The signals representing the maximum values of the signals are displayed on the Y-axis through the logarithmic converter 30.

Figure 4:
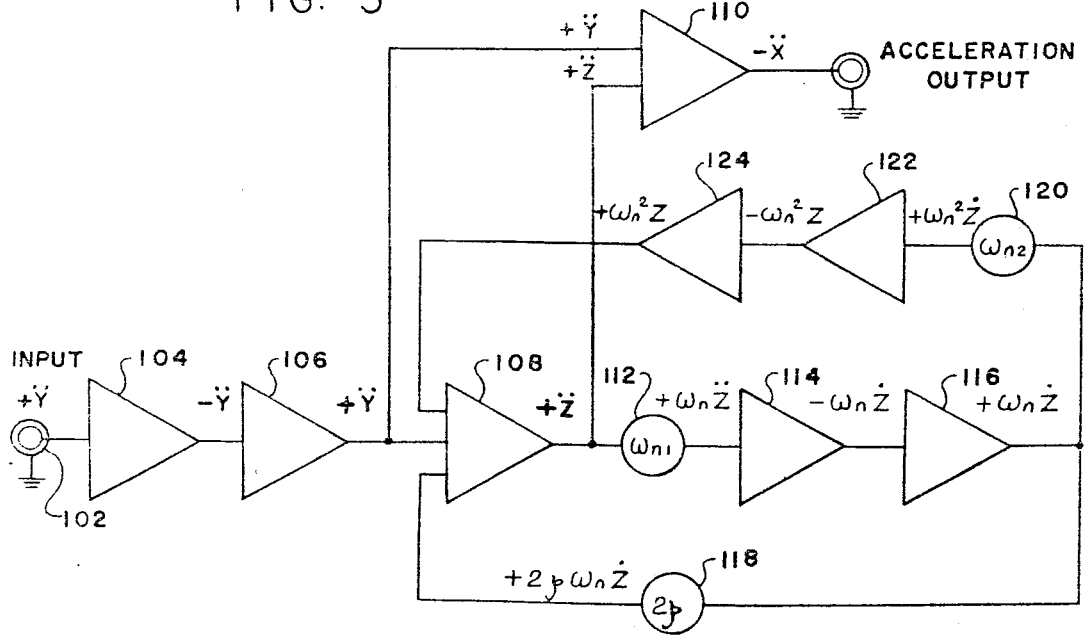
FIG. 4 is a block diagram of the computing loops shown in the analyzer of FIG. 3.

FIG. 4 is a block diagram of the computing loop circuit 90. Applied to the input 102 of the computing loop circuit 90 is an input forcing function $+\ddot{y}$. The signs of the signals are independent of mathematical operation and refer only to operational amplifier characteristics. This input is applied to a buffer amplifier 104 which serves to isolate the analyzer 22 from the shock source. The output from the buffer amplifier 104, $-\ddot{y}$, is applied to a gain control amplifier 106 which has the gain control of the computing loop circuit 90 in its feedback network allowing a gain of 1 or 10 in this stage. The output from the amplifier 106 is $-\ddot{y}$. This output is applied to a summing amplifier 108 which sums with unity gain all the terms of the differential equation (1) above. The inputs to the amplifier 108 are: $+\ddot{y} + 2\theta\omega_n \dot{z} + \omega_n^2 z$ and the output of amplifier 108 is $\ddot{z}$ where $\ddot{z}$ is defined as the relative acceleration between the base and the sprung mass $(\ddot{z} - \ddot{x})$ and $\dot{z}$ is the relative velocity between the base and the sprung mass $(\dot{y} - \dot{x})$ and $z$ is the relative displacement between the base and the sprung mass $(y - x)$.

The output from the gain control amplifier 106 is also applied to a subtractor 110. The subtractor 110 is a subtracting inverting circuit using unity gain. The output from the summing amplifier 108, which is $+\ddot{z}$ is simultaneously applied to a coefficient potentiometer 112 and to the input of the subtractor 110. Since $\omega_n$ is a coefficient of equation (1), it is represented by a constant equal to 0.1 to 1.0 in precision resistors and ganged tracked precision potentiometers for vernier frequency control. The output from the coefficient potentiometer 112 is $\omega_n \ddot{z}$. The $\omega_n \ddot{z}$ output from the potentiometer 112 is applied to integrator 114 whose integrating resistor and capacitor are chosen to make its gain unity when $\omega_n = (1/RC)$. The output of the integrator is $-\omega_n \dot{z}$ and is applied to a buffer inverter 116. The output of the integrator logs the input in phase by 90°. The signal $\omega_n \dot{z}$ represents $\omega_n$ times the relative velocity of the sprung mass with respect to the base. This signal is operated on by a damping potentiometer 118 having a coefficient of $2\theta$ where Q is equal to $(1/2\theta)$ and $\theta$ is defined as the precent of critical damping. Since $2\theta$ is a coefficient of equation (1), $(1/2\theta) = Q$ is generated by a series of voltage dividers for fixed $Q$, and a single precision potentiometer for variable $Q$. The output of the $2\theta$ potentiometer 118 is $+2\theta \omega_n \dot{z}$ and is applied as feedback to the input of the summing amplifier 108.

The output from the buffer-inverter 116 is also applied to $\omega_{n_2}$ coefficient potentiometer 120 which is identical with and tracks $\omega_{n_1}$ coefficient potentiometer 112. The output of the potentiometer 120 is $\omega_n^2 \dot{z}$ and is applied to an integrator 122 which is identical with and tracks integrator 114. The output of integrator 122 is $-\omega_n^2 z$ and represents $\omega_n^2$ times the relative displacement between the sprung mass and the base. This relative displacement signal $-\omega_n^2 z$ is applied to a buffer-inverter 124 having unity gain and whose output is $+\omega_n^2 z$. This output is also applied as feedback to the summing amplifier 108.

The output of the subtractor 110 is the negative of the time history of the absolute acceleration of the sprung mass, $-\ddot{x}$. This time history of the acceleration $-\ddot{x}$ is an acceleration output of the computing loop circuit 90 and is applied to the peak circuit 100 through the gate 98 as shown in FIG. 3.

Figure 5:
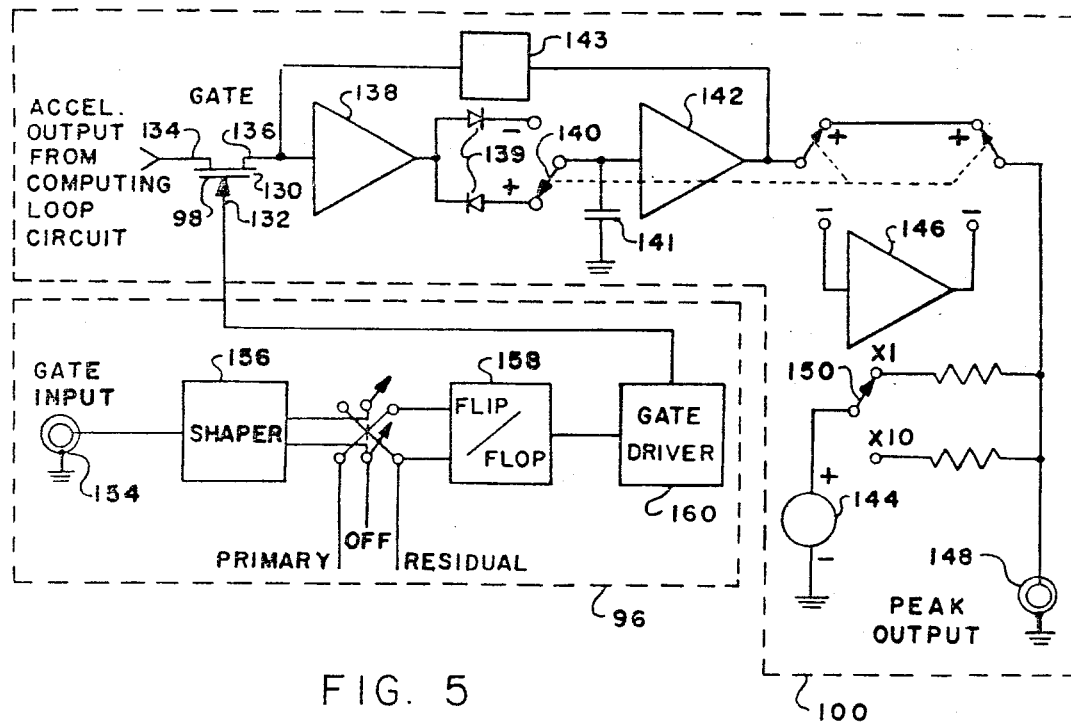
FIG. 5 shows a block diagram of the peak and mode circuits of the analyzer of FIG. 3.

FIG. 5 shows a block diagram of the peak circuit 100 and the mode circuit 96 in FIG. 3. The acceleration output from the computing loop circuit 90 is applied to the gate 98 which is shown in FIG. 5 as a field-effect transistor 130 having a gate electrode 132, a drain electrode 134 and a source electrode 136. The output from the mode circuit 96 is applied to the gate electrode 132 of the transistor 130. The source electrode 136 of the transistor 130 is connected to an amplifier 138. The signal applied at the input of the amplifier 138 of polarity selected by diodes 139 and switch 140 charges a capacitor 141 to the peak value of the input. An amplifier 142 then supplies this output either directly on a meter 144 in the plus mode or in the minus mode through an inverting amplifier 146. A feedback network 143 is connected between the output of the amplifier 142 and the input of the amplifier 138 in order to eliminate error introduced by polarity selection diodes 139. It should be noted that regardless of the polarity of the signal, the voltage appearing at the peak output terminal 148 is always a positive voltage allowing positive and negative spectra on the same chart and on the same axes in an X-Y plot. The meter 144 has a times one, times 10 switch 150. The voltage appearing at the peak output terminal 148 is independent of the times one, times 10 switch 150 and has the same scale factor as the signal applied at the input. The peak circuit 100 may be modified to provide information relating to the maximum of the positive or negative peak acceleration values irrespective of sign (referred to as maximum information). This modification would be accomplished by providing discrete-signed peak circuits and a comparing circuit to determine and display the maximax signal and its sign.

In the operation of the mode circuit 96, the transistor 130 which is a field-effect transistor acts as a gate to any signal entering the peak circuit amplifier 138. A gate input is applied at terminal 154 and is then amplified and differentiated in a shaper circuit 156 to produce two negative pulses. The first negative pulse is at the leading edge and the second at the trailing edge of the gate input. These two negative pulses are used for triggering flip flop circuit 158. The output of the flip flop circuit 158 drives a gate driver circuit 160 which in turn drives the gate of the field-effect transistor 130. The inversion of the position in time of the set and reset pulses to the flip flop circuit 158 produces the residual and primary effects as desired. In the off position, flip flop circuit 158 is set such that gating transistor 130 is connected from drain electrode 134 to source electrode 136.

Figure 6:
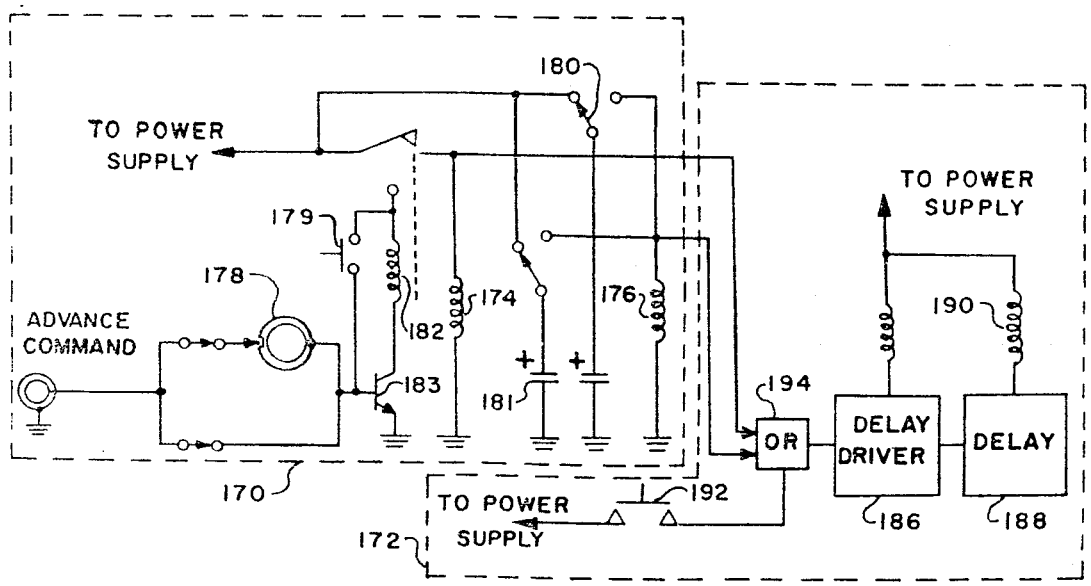
FIG. 6 is a block diagram of the automatic incrementing circuits of the analyzer of FIG. 3.

FIG. 6 shows a block diagram of the automatic incrementing circuits 94 which include a control circuit 170 and a reset circuit 172. The control circuit 170 includes a twenty position stepping switch 174 whose actuating solenoid is shown as a coil and which acts as the 1/6 octave frequency selector. Another twenty position stepping switch 176 whose actuating solenoid is shown as a coil is provided as a decade selector switch where the first, fifth, ninth, thirteenth and seventeenth positions are interconnected. The switch 176 makes 1/6 cycle for each complete analyzer cycle of 80 steps. In the automatic mode when the twentieth position of the 1/6 octave switch 174 and a decade position determined by a maximum frequency switch 178 is reached, no further advance command pulses are accepted by the drive circuitry. This automatically ends the run at the maximum frequency indicated. Manual control of the 1/6 octave stepping switch 174 is accomplished by depressing advance 1/6 octave push button 179. Depressing button 179 energizes mercury-witted relay 182 through the conduction of transistor 183 which in turn energizes switch 174. Utilization of transistor 183 allows advance of 1/6 octave switch 174 by a low level advance command at the advance command input terminal. Manual control of the decade stepping switch 176 is provided by depressing step decade pushbutton 180. The decade switch 176 is automatically incremented during the transition of 1/6 octave switch 174 from position twenty to position one by discharging a capacitor 181 into decade switch 176.

The functions of resetting the integrators 114 and 122 in the computing loop circuit 90 and resetting the storage capacitor 141 in the peak circuit 100 are accomplished by several mechanical reed relays which are operated by a delay driver 186. The reed relays are operated by transistors included in the delay driver 186. The release of these relays is delayed such that when all functions have been completed, the integrators 114 and 122 are released. A further delay is provided by a delay circuit 188 which holds the peak holding capacitor 141 until all transients have subsided.

This additional delay affects only peak reset relay 190. A complete reset cycle is initiated through an OR gate 194 in any of three ways: (1) by depressing a meter reset button 192; (2) by activating 1/6 octave stepping switch 174; or (3) by activating decade switch 176. The frequency output voltage from automatic incrementing circuits 94 is used to drive the X-axis of the X-Y plotter 32.

The test pulse generator 91 shown in FIG. 3 includes a monostable multivibrator which is actuated by a step input from a mercury-witted relay which is energized by depressing a pushbutton switch (none of which are shown). The mercury-witted relay insures a single pulse for each switch depression. The square pulse generated is applied to the input of the buffer amplifier 104 of computing loop circuit 90.

OPERATION

The operation of the combined shock spectrum analysis and synthesis system shown in FIG. 1 is as follows. The shock spectrum which it is desired to synthesize is plotted on the X-Y plotter 32 after the system has been calibrated. Then the shake table 16 is energized and the shaker gain set to some defined value. Then the analyzer 22 is adjusted to the lowest frequency where an input is demanded by the desired spectrum. Then repetitive inputs are applied from the synthesizer 12 increasing the level at that frequency until the desired level is reached as indicated by the plotted spectrum. The potentiometer 48 connected to the output of the lowest frequency oscillator 40 in decade A is adjusted to the desired acceleration level of the desired spectrum on the plotter 32. Then the analyzer 22 is advanced to the next ⅓ octave step and adjust the potentiometer corresponding to that frequency. This process of applying the repetitive inputs from the synthesizer 12 is repeated until the entire desired spectrum has been synthesized. The timing for each of the decades A, B and C is determined by the desired number of cycles required at the lowest frequency in the particular decade. The time ratio of the decades A, B and C should be basically 1 to 0.1 to .01 respectively.

Since each lower frequency contributes to the frequencies above it, it may be necessary to make a second pass beginning again at the lowest desired frequency. Two consecutive passes should produce the desired spectrum within ± 10 percent. If a third pass is necessary this error may be reduced. After the desired spectrum has been completely synthesized, the data storage system 24 is calibrated and connected. The synthesizer output which had been operating at 1/10 level is then switched to the times one position of the multiplier switch 80 and a single shock is applied to the specimen being tested. Then a tape loop is prepared and a completed shock spectrum plot is made. Once the data is taken from the shake table 16 at full level, then shock spectrum analysis may be performed at any time since the synthesizer 12 and shake table 16 are no longer required for the shock analysis.

Figure 7:
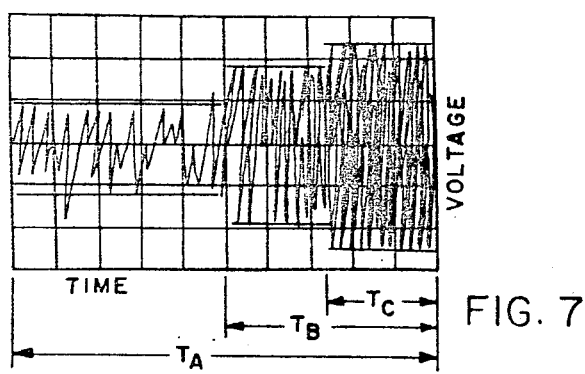
FIG. 7 is a diagram of a typical output pulse from the synthesizer of FIG. 1.

FIG. 7 is a plot of typical output pulse from the synthesizer 12. All oscillators 40, 42 and 44 have been set at equal levels. Time is plotted against voltage and the graph shows the contribution of the lower frequencies to the higher ones. Also shown is the timing of each of the decades — $T_A$, $T_B$ and $T_C$.

The particular shock spectrum analysis and synthesis method and apparatus described above is exemplary but is no means confined to the spectra patterns that have been described. Also, it should be noted that although the oscillators shown in FIG. 2 generate sinusoidal waveforms, other waveforms may be utilized so that higher-order harmonics may be used. For example, instead of steady-state sinusoids, a plurality of square waves may be used to synthesize a shock spectrum. It should also be understood that the synthesizer of the present invention is equally well suited to the simulation of the absolute Fourier spectra as well as a specified shock spectra.

The novel and improved shock spectrum analysis and synthesis method and apparatus of the present invention is very practical and completely compatible with commercially available shake table equipment. Obviously many modifications and variations of the present invention are possible in the light of the above teachings. It is therefore to be understood, that within the scope of the appended claims, the invention may be practiced otherwise than as specifically described.

We claim:

1. A method of analyzing an input acceleration applied to a test specimen comprising the steps of:
  applying a transient force to a test specimen;
  sensing the input acceleration of said specimen in response to said force;
  providing an electrical signal proportional to said sensed input acceleration;
  computing from said electrical signal response signals respresenting acceleration, velocity and displacement of a damped single-degree-of-freedom mass system of a specified natural frequency to said input acceleration;
  automatically incrementing the response signals to another natural frequency for analysis and automatically resetting the response signals to their initial conditions after each frequency response has been computed;
  gating the computed response signals in such a way as to separate those parts of the response signals defined as primary and residual;
  applying the computed acceleration response signals to a peak sampling and holding circuit; and
  displaying the peak values of the acceleration response signals.

2. A method in accordance with claim 1 including the additional step of providing the peak value of the response signals for recording.

3. Apparatus for analyzing an input acceleration applied to a test specimen, comprising:
  means for applying a transient force to a test specimen;
  means for sensing the input acceleration of said specimen in response to said force;
  means for providing an electrical signal proportional to said sensed input acceleration;
  means for computing from said electrical signal response signals representing acceleration, velocity and displacement of a damped single-degree-of-freedom mass system of a specified natural frequency to said input acceleration;
  means for automatically incrementing the response signals to another natural frequency for analysis;
  means for automatically resetting the response signals to their initial conditions after each frequency response has been computed;

means for establishing the peak values of the computed acceleration response signals; and means for displaying the peak values of the acceleration response signals.

4. Apparatus as set forth in claim 3 including: means for gating the computed responses in such a way as to separate those parts of the response defined as primary and residual.

5. Apparatus as set forth in claim 3 including: means for recording the peak value of the responses.

6. Apparatus for analyzing an input acceleration applied to a test specimen, comprising:

an electrodynamic shaker for applying a transient force to a test specimen;

means for sensing the input acceleration of said specimen in response to said force;

means for providing an electrical signal proportional to said sensed input acceleration;

a computing loop circuit for computing from said electrical signal response signals representing acceleration, velocity and displacement of a damped single-degree-of-freedom mass system of a specified natural frequency to said input acceleration;

an automatic incrementing circuit for automatically incrementing the response signals to another natural frequency for analysis;

a reset circuit for automatically resetting the response signals to their initial conditions after each frequency response has been computed;

means for gating the computed response signals in such a way as to separate those parts of the response signals defined as primary and residual;

peak circuit means for establishing the peak values of the acceleration response signals;

display means integral with said peak circuit means for displaying the peak values of the acceleration response signals; and a two axis plotting means for recording the peak values of the acceleration response signals for each natural frequency.

7. Apparatus as set forth in claim 6 where said automatic incrementing circuitry includes a control circuit for controlling the operation of said computing loop circuit.

8. Apparatus as set forth in claim 6 wherein said automatic incrementing circuitry includes a reset circuit for resetting the computing loop circuit.

9. A method of analyzing an input acceleration applied to a test specimen comprising the steps of:

applying a transient force to a test specimen;

sensing the input acceleration of said specimen in response to said force;

providing an electrical signal proportional to said sensed input acceleration;

computing from said electrical signal response signals representing acceleration, velocity and displacement of a damped single-degree-of-freedom mass system of a specified natural frequency to said input acceleration;

automatically incrementing the response signals to another natural frequency for analysis and automatically resetting the response signals to their initial conditions after each frequency response has been computed;

applying the computed acceleration response signals to a peak sampling and holding circuit; and displaying the peak values of the acceleration response signals.

* * * * *